United States Patent
Su et al.

(10) Patent No.: US 12,401,804 B2
(45) Date of Patent: Aug. 26, 2025

(54) IMAGE PREDICTION FOR HDR IMAGING IN OPEN-LOOP CODECS

(71) Applicant: Dolby Laboratories Licensing Corporation, San Francisco, CA (US)

(72) Inventors: Guan-Ming Su, Fremont, CA (US); Harshad Kadu, Santa Clara, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 18/012,582

(22) PCT Filed: Jun. 21, 2021

(86) PCT No.: PCT/US2021/038258
§ 371 (c)(1),
(2) Date: Dec. 22, 2022

(87) PCT Pub. No.: WO2021/262599
PCT Pub. Date: Dec. 30, 2021

(65) Prior Publication Data
US 2023/0254494 A1 Aug. 10, 2023

Related U.S. Application Data

(60) Provisional application No. 63/043,198, filed on Jun. 24, 2020.

(30) Foreign Application Priority Data

Jun. 24, 2020 (EP) ..................................... 20182014

(51) Int. Cl.
*H04N 19/186* (2014.01)
*H04N 19/182* (2014.01)
*H04N 19/597* (2014.01)

(52) U.S. Cl.
CPC ......... *H04N 19/186* (2014.11); *H04N 19/182* (2014.11); *H04N 19/597* (2014.11)

(58) Field of Classification Search
CPC .. H04N 19/186; H04N 19/182; H04N 19/597; H04N 19/117; H04N 19/136; H04N 19/146; H04N 19/172; H04N 19/85
(Continued)

(56) References Cited

U.S. PATENT DOCUMENTS 8,503,535 B2 8/2013 Jax
8,811,490 B2 8/2014 Su
(Continued)

FOREIGN PATENT DOCUMENTS

CN 105723711 A 6/2016
JP 2013519157 A 5/2013
(Continued)

OTHER PUBLICATIONS

Ono, S. et al "Color-Line Regularization for Color Artifact Removal" IEEE Transactions on Computational Imaging, vol. 2, Issue 3, Sep. 2016.
(Continued)

*Primary Examiner* — Susan E. Hodges

(57) ABSTRACT

Given input HDR and SDR images representing the same scene, a prediction model to predict the HDR image from a compressed representation of the input SDR image is generated as follows: a) generate noise data based at least on the characteristics of the HDR image b) generate a noisy SDR image by adding the noise data to the SDR image c) generate an augmented HDR data set and an augmented SDR data set by using the input HDR and SDR images and the noisy SDR image d) generate a prediction model to predict the augmented HDR data set based on the augmented SDR data set and e) solve the prediction model according to a minimiza-
(Continued)

tion-error criterion to generate a set of prediction parameters to be transmitted to a decoder together with a compressed representation of the input SDR image to reconstruct an approximation of the input HDR image.

16 Claims, 3 Drawing Sheets

(58) Field of Classification Search
USPC .................................................. 375/240, 40
See application file for complete search history.

(56) References Cited

U.S. PATENT DOCUMENTS

| | | |
|---|---|---|
| 9,420,302 B2 | 8/2016 | Talebi Esfandarani |
| 9,532,059 B2 | 12/2016 | Baylon |
| 9,710,896 B2 | 7/2017 | Lim |
| 9,997,163 B2 | 6/2018 | Schnabel |
| 10,136,147 B2 | 11/2018 | Su |
| 2007/0069980 A1* | 3/2007 | MacInnis ................ H04N 5/21 |
| | | 348/E5.077 |
| 2011/0188744 A1 | 8/2011 | Sun |
| 2013/0148029 A1 | 6/2013 | Gish |
| 2014/0029675 A1 | 1/2014 | Su |
| 2015/0341675 A1 | 11/2015 | Su |
| 2019/0110054 A1 | 4/2019 | Su |
| 2019/0130903 A1 | 5/2019 | Sriram |
| 2019/0303795 A1 | 10/2019 | Khiari |
| 2021/0368212 A1* | 11/2021 | Song ................... H04N 19/117 |
| 2022/0408081 A1 | 12/2022 | Su |

FOREIGN PATENT DOCUMENTS

| | | |
|---|---|---|
| WO | 2011097060 A2 | 8/2011 |
| WO | 2014107255 A1 | 7/2014 |
| WO | 2015073373 A1 | 5/2015 |
| WO | 20190125241 W | 6/2019 |
| WO | 2019169174 A1 | 9/2019 |
| WO | 2019217751 A1 | 11/2019 |

OTHER PUBLICATIONS

Subhayan, M. et al."Adaptive dithering Using Curved Markov-Gaussian Noise in the Quantized Domain for Mapping SDR to HDR Image" Dec. 8, 2018, Advances in Databases and Information Systems, Springer International Publishing, 193-203.

Haan, Wiebe de et al. HDR CE6: Core Experiments 4.3 and 4.6a: Description of the Philips System in 4:2:0 and with Automatic Reshaper Parameter Derivation , JCTVC-W0063 (version 2) , ITU Feb. 20, 2016 , pp. 1-13. 16 pages.

Song, Qing et al. , Efficient Debanding Filtering for Inverse Tone Mapped High Dynamic Range Videos , IEEE Transactions on Circuits and Systems for Video Technology , USA , IEEE , Jul. 11, 2019 , vol. 30, No. 8 , pp. 2575-2589 , [online] , [retrieved on Mar. 26, 2024]. 18 pages.

* cited by examiner

IMAGE PREDICTION FOR HDR IMAGING IN OPEN-LOOP CODECS

CROSS-REFERENCE TO RELATED APPLICATIONS

This application is a National Phase entry of PCT Patent Application No. PCT/US2021/038258, having international filing date of Jun. 21, 2021, which claims priority to European Patent Application No. 20182014.9 and U.S. Provisional Application No. 63/043,198, both filed on Jun. 24, 2020, each of which is incorporated by reference in its entirety.

TECHNOLOGY

The present invention relates generally to images. More particularly, an embodiment of the present invention relates to image prediction for high dynamic range (HDR) imaging in open-loop codecs.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR.

In practice, images comprise one or more color components (e.g., luma Y and chroma Cb and Cr) wherein each color component is represented by a precision of n-bits per pixel (e.g., n=8). Using linear or gamma luminance coding, images where n≤8 (e.g., color 24-bit JPEG images) are considered images of standard dynamic range, while images where n>8 may be considered images of enhanced or high dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "reshaping" or "remapping" denotes a process of sample-to-sample or codeword-to-codeword mapping of a digital image from its original bit depth and original codewords distribution or representation (e.g., gamma, PQ, or HLG and the like) to an image of the same or different bit depth and a different codewords distribution or representation. Reshaping allows for improved compressibility or improved image quality at a fixed bit rate. For example, without limitation, forward reshaping may be applied to 10-bit or 12-bit PQ-coded HDR video to improve coding efficiency in a 10-bit video coding architecture. In a receiver, after decompressing the received signal (which may or may not be reshaped), the receiver may apply an inverse (or backward) reshaping function to restore the signal to its original codeword distribution and/or to achieve a higher dynamic range.

In HDR coding, image prediction (or reshaping) allows an HDR image to be reconstructed using a baseline standard dynamic range (SDR) image and a set of prediction coefficients representing a backward reshaping function. Legacy devices may simply decode the SDR image; however, HDR displays may reconstruct the HDR image by applying the backward reshaping function to the SDR image. In video coding, such image prediction may be used to improve coding efficiency while maintaining backwards compatibility. Such systems may be referred to as "closed loop," where the encoder includes a decoding path and prediction coefficients are derived based on both the original and decoded SDR and HDR data, or "open loop," where there is no such decoding loop, and prediction coefficients are derived based solely on pairs of the original data. As appreciated by the inventors here, improved techniques for efficient image prediction for open-loop codecs are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Image prediction techniques for the efficient coding of images in open-loop codecs are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to image prediction techniques. In an embodiment, in an apparatus comprising one or more processors, a processor receives input pairs of reference images in high dynamic range (HDR) and standard dynamic range (SDR) representing an identical scene. The processor:
- generates noise data with a noise strength based at least on characteristics of the HDR image;
- generates a noise input data set by adding the noise data to the SDR image;
- generates a first augmented input data set based on the HDR image;
- combines the SDR image and the noise input data set to generate a second augmented input data set;
- generates a prediction model to predict the first augmented input data set based on the second augmented input data set;
- solves the prediction model according to a minimization-error criterion to generate a set of prediction-model parameters;
- compresses the second input image to generate a compressed bitstream; and
- generates an output bitstream comprising the compressed bitstream and the prediction-model parameters.

Example HDR Coding System

Figure 1A:
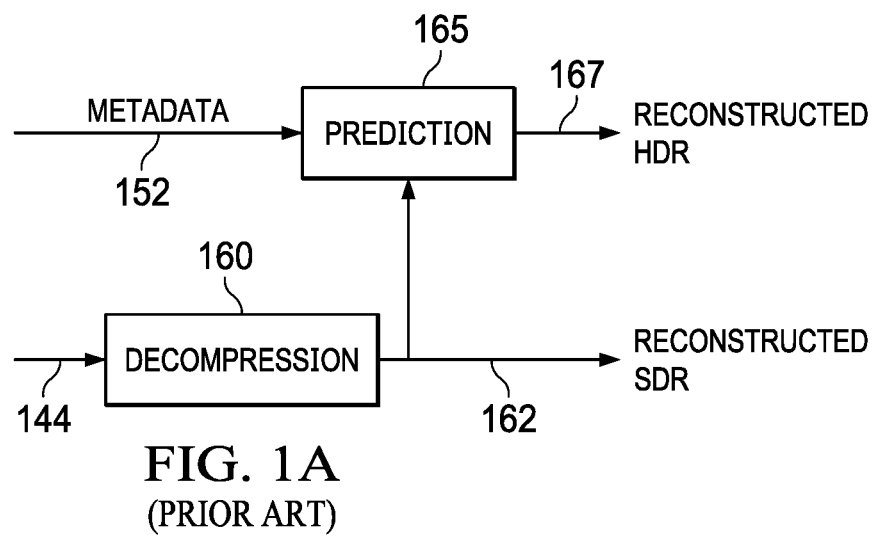
FIG. 1A depicts an example single-layer decoder for HDR data using image prediction according to prior art.
Figure 1B:
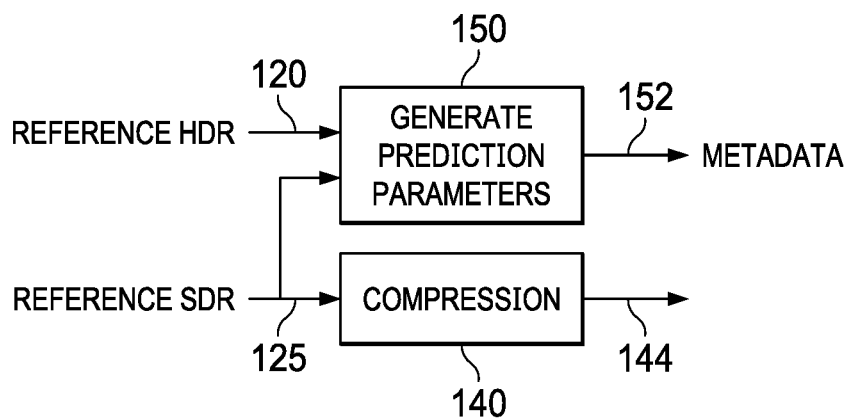
FIG. 1B depicts an example HDR open-loop encoder using image prediction according to prior art.
Figure 1C:
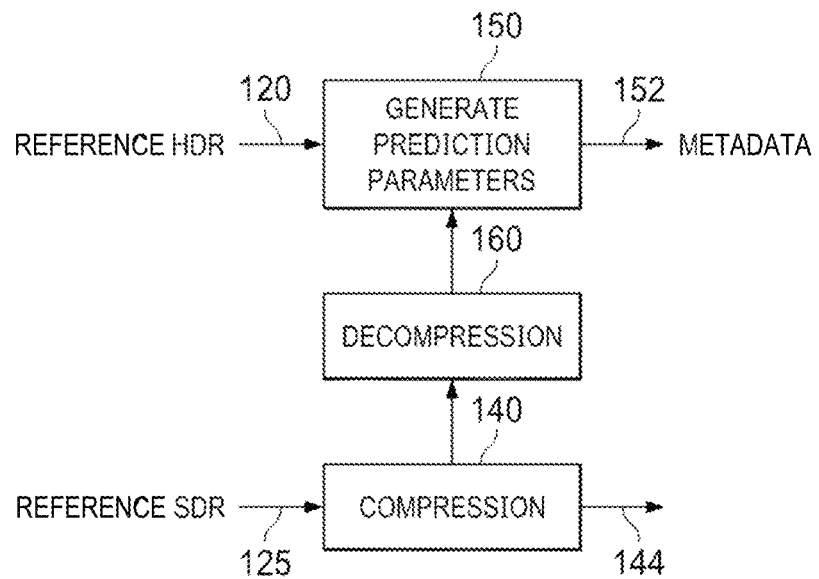
FIG. 1C depicts an example HDR closed-loop encoder using image prediction according to prior art.

FIG. 1A illustrates an example single-layer decoder architecture using image prediction, which may be implemented with one or more computing processors in a downstream video decoder. FIG. 1B illustrates an example "open-loop" encoder architecture, which may also be implemented with one or more computing processors in one or more upstream video encoders. FIG. 1C illustrates an example "closed-loop" encoder architecture.

Under this framework, given reference HDR content (120), corresponding SDR content (125) (that is, content that represents the same images as the HDR content, but color-graded and represented in standard dynamic range) is encoded and transmitted in a single layer of a coded video signal (144) by an upstream encoding device that implements the encoder-side codec architecture. The SDR content (144) is received and decoded, in the single layer of the video signal, by a downstream decoding device. Prediction metadata (e.g., backward reshaping parameters) (152) is also encoded and transmitted in the video signal with the SDR content so that HDR display devices can reconstruct HDR content based on the SDR content (144) and the received metadata (152).

In FIG. 1B and FIG. 1C, in an embodiment, given input HDR data (120), SDR data (125) may be generated from the HDR data via tone-mapping, forward reshaping, manually (during color-grading), or via a combination of techniques known in the art. In another embodiment, given reference SDR data (125), the HDR data (120) may be generated from the SDR data via inverse tone-mapping, backward reshaping, manually (during color-grading), or via a combination of techniques known in the art. A compression block 140 (e.g., an encoder implemented according to any known video coding algorithms, like AVC, HEVC, AV1, and the like) compresses/encodes the SDR images (125) in a single layer 144 of a coded bitstream.

The metadata (152), as generated by unit 150, may be multiplexed as part of the video signal 144, for example, as supplemental enhancement information (SEI) messaging. Thus, the metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder architectures of FIG. 1B and FIG. 1C can be used to avoid directly encoding the input HDR images (120) into coded/compressed HDR images in the video signal; instead, the metadata (152) in the video signal can be used to enable downstream decoding devices to reconstruct the SDR images (125) (which are encoded in the video signal) into reconstructed HDR images (167) that are identical to or closely/optimally approximate the reference HDR images (120).

In some embodiments, as illustrated in FIG. 1A, the video bitstream (144) with the compressed SDR images and the metadata (152) with prediction parameters generated by the encoder are received as input on the decoder side of the codec framework. A decompression block 160 decompresses/decodes compressed video data in the single layer (144) of the video signal into the decoded SDR images (162). Decompression 160 typically corresponds to the inverse of compression 140. The decoded SDR images (162) may be the same as the SDR images (125), subject to quantization errors in the compression block (140) and in the decompression block (160), which may have been optimized for SDR display devices. The decoded SDR images (162) may be outputted in an output SDR video signal (e.g., over an HDMI interface, over a video link, etc.) to be rendered on an SDR display device.

In addition, prediction block 165 (which also may be referred to as a "composer") applies the metadata (152) from the input bitstream to the decompressed data (162) to generate reconstructed HDR images (167). In some embodiments, the reconstructed images represent production-quality or near-production-quality HDR images that are identical to or closely/optimally approximating the reference HDR images (120). The reconstructed images (167) may be outputted in an output HDR video signal (e.g., over an HDMI interface, over a video link, etc.) to be rendered on an HDR display device.

In some embodiments, display management operations specific to the HDR display device may be performed on the reconstructed images (167) as a part of HDR image rendering operations that render the backward reshaped images (167) on the HDR display device.

FIG. 1B depicts an "open-loop" encoding architecture, where metadata 152 are generated by unit 150 using only the input HDR and SDR images. FIG. 1C depicts a "closed-loop" encoding architecture that includes an additional decompression block (160). A closed-loop design uses an extra video decompression step 160, mimicking the way a decoder would operate. This provides a far more accurate description of the data to generate (e.g., in block 150) the prediction parameters; however, it requires an extra decoding step. This is fine when generating bitstreams in a single bit rate or profile, but it is more computation-intensive when a server needs to generate streams at multiple bit rates, commonly referred to as a "bit-rate ladder." Thus, as appreciated by the inventors, it is beneficial to improve open-loop architectures to provide performance as good or better as closed-loop system, but with reduced computational complexity.

Example Systems for Improved Prediction in Open-Loop Systems

Single Channel Predictor

Consider pairs of input data $\{x_i\}$ and observed output data $\{y_i^{(g)}\}$, where i=0, 1, . . . , P−1, where the output is generated as $$y_i^{(g)} = f^{(g)}(x_i) = \sum_{k=0}^{K^{(g)}} a_k^{(g)}(x_i)^k + n_i^{(g)}, \tag{1}$$

where $f^{(g)}$ denotes a "ground truth" polynomial model of order $K^{(g)}$ with parameters $a_k^{(g)}$, and $n_i^{(g)}$, without loss of generality, denotes additive white Gaussian noise with zero mean and variance $(\sigma^{(g)})^2$, denoted as $n_i^{(g)} \sim N(0, (\sigma^{(g)})^2)$. Let $$m^{(g)} = \begin{bmatrix} a_0^{(g)} \\ a_1^{(g)} \\ \vdots \\ a_{K^{(g)}}^{(g)} \end{bmatrix} \tag{2}$$

denote the vector of the coefficients in the model, and let $$y^{(g)} = \begin{bmatrix} y_0^{(g)} \\ y_1^{(g)} \\ \vdots \\ y_{P-1}^{(g)} \end{bmatrix} \tag{3}$$

denote the vector of observed output data.

Under traditional prediction modeling, given the set of P ground truth data, $\{(x_i, y_i^{(g)})\}$, one would like to construct a prediction model using a new polynomial model $f^{(c)}$ with order $K^{(c)}$, given by $$\hat{y}_j^{(c)} = f^{(c)}(x_i) = \sum_{k=0}^{K^{(c)}} a_k^{(c)}(x_i)^k, \tag{4}$$

where a vector of the polynomial coefficients $a_k^{(c)}$ is denoted as $$m^{(c)} = \begin{bmatrix} a_0^{(c)} \\ a_1^{(c)} \\ \vdots \\ a_{K^{(c)}}^{(c)} \end{bmatrix}. \tag{5}$$

Given the representation $$S^{(c)} = \begin{bmatrix} 1 & x_0 & \cdots & (x_0)^{K^{(c)}} \\ 1 & x_1 & \cdots & (x_1)^{K^{(c)}} \\ \vdots & \vdots & & \vdots \\ 1 & x_{P-1} & \cdots & (x_{P-1})^{K^{(c)}} \end{bmatrix} \text{ and } \hat{y}^{(c)} = \begin{bmatrix} \hat{y}_0^{(c)} \\ \hat{y}_1^{(c)} \\ \vdots \\ \hat{y}_{P-1}^{(c)} \end{bmatrix}, \tag{6}$$

equation (4) can be expressed as:

$$\hat{y}^{(c)} = S^{(c)} m^{(c)}, \tag{7}$$

Given equation (7), an optimal set of polynomial coefficients may be defined to minimize the error between the observed data and the predicted data, $$m^{(c),opt} = \arg\min \|\hat{y}^{(c)} - y^{(g)}\| = \arg\min \|S^{(c)} m^{(c)} - y^{(g)}\|,$$

where, under minimum mean square error (MSE) optimization, the optimal solution is given by $$m^{(c),opt} = ((S^{(c)})^T (S^{(c)}))^{-1} ((S^{(c)})^T y^{(g)}). \tag{8}$$

The model of equation (7) works well as long as the predictor has access to the original $x_i$ data. Consider of this scenario as an approximation to the closed-loop architecture, where the decompressor 160 provides a pretty accurate copy of the SDR data as will be seen by the decoder. But, what if such data is unavailable? In an embodiment, to better take into account of the uncertainty in the available $x_i$ data (e.g., under the open-loop architecture), to build a more robust predictor, it is proposed to generate and use a duplicate set of input data, $\{\tilde{x}_i | i=0, 1, \ldots, P-1\}$, generated by adding white Gaussian noise (e.g., $n_i^{(n)} \sim N(0, (\sigma^{(n)})^2)$) to the original input $\{x_i | i=0, 1, \ldots, P-1\}$. Thus $$\tilde{x}_i = x_i + n_i^{(n)}, \text{ for } i=0,1,\ldots,P-1. \tag{9}$$

Figure 1D:
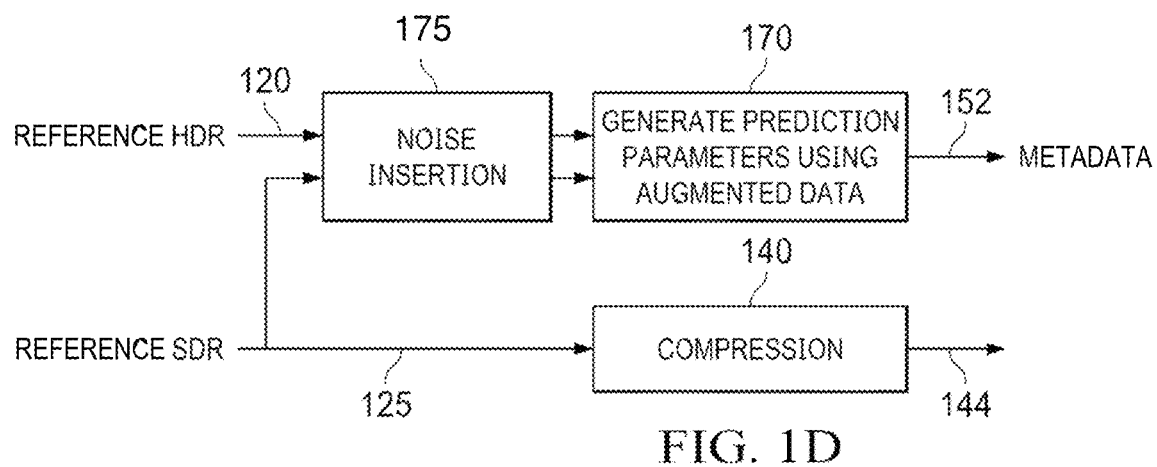
FIG. 1D depicts an example HDR open-loop encoder using image prediction according to an embodiment of this invention.

FIG. 1D depicts an example of an open-loop architecture supporting the proposed augmented-data prediction model according to an embodiment. Compared to FIG. 1B, the architecture in FIG. 1D includes a new noise-insertion module (175) which generates noisy SDR and/or HDR data. The original and the noisy SDR and HDR data are then combined to form augmented SDR and HDR data that are fed to unit 170 to solve for the prediction parameters of the augmented-data prediction model. An augmented input data set may denote the combination of an input image and a noise input data set.

In an embodiment, observed data $\{\tilde{y}_i | i=0, 1, \ldots, P-1\}$ of this new augmented-data prediction model is considered to be the same as $\{y_i^{(g)} | i=0, 1, \ldots, P-1\}$, $$\tilde{y}_i = y_i^{(g)} \text{ for } i=0,1,\ldots,P-1. \tag{10}$$

In another embodiment, noise could also be added in modeling the observed data; however, experimental results showed no significance improvement by modeling noise in the observed data, thus, without loss of generality, in the subsequent discussion, to simplify the prediction modeling, no such noise will be considered.

Given two sets of pairs of training data, e.g., $\{(x_i, y_i^{(g)})\}$ and $\{(\tilde{x}_i, \tilde{y}_i)\}$, a new polynomial model $f^{(n)}$ with order $K^{(n)}$ (e.g., $K^{(n)} = K^{(c)}$) can be expressed as:

$$\hat{y}_i^{(n)} = f^{(n)}(x_i) = \sum_{k=0}^{K^{(n)}} a_k^{(n)}(x_i)^k. \tag{11}$$

Again, given a matrix/vector representation of the input and output data given by:

$$m^{(n)} = \begin{bmatrix} a_0^{(n)} \\ a_1^{(n)} \\ \vdots \\ a_{K^{(n)}}^{(n)} \end{bmatrix}, \tag{12}$$

$$\tilde{y}^{(n)} = \begin{bmatrix} \tilde{y}_0 \\ \tilde{y}_1 \\ \vdots \\ \tilde{y}_{P-1} \end{bmatrix}, \text{ and } \tilde{S}^{(n)} = \begin{bmatrix} 1 & \tilde{x}_0 & \cdots & (\tilde{x}_0)^{K^{(n)}} \\ 1 & \tilde{x}_1 & \cdots & (\tilde{x}_1)^{K^{(n)}} \\ \vdots & \vdots & & \vdots \\ 1 & \tilde{x}_{P-1} & \cdots & (\tilde{x}_{P-1})^{K^{(n)}} \end{bmatrix}, \tag{13}$$

by combing the old and new data set, one can compose the combined (or augmented) data set $$y^{(n)} = \begin{bmatrix} y^{(g)} \\ \tilde{y}^{(n)} \end{bmatrix} \text{ and } S^{(n)} = \begin{bmatrix} S^{(c)} \\ \tilde{S}^{(n)} \end{bmatrix}, \quad (14)$$

and the augmented-data prediction model can be expressed as $$\hat{y}^{(n)} = S^{(n)} m^{(n)}. \quad (15)$$

Solving for $m^{(n)}$ can be formulated as an optimization problem:

$$m^{(n),opt} = \arg\min\|\hat{y}^{(n)} - y^{(n)}\| = \arg\min\|S^{(n)} m^{(n)} - y^{(n)}\|,$$

with an optimal solution (under MSE), given by $$m^{(n)opt} = ((S^{(n)})^T (S^{(n)}))^{-1} ((S^{(n)})^T y^{(n)}). \quad (16)$$

Figure 2:
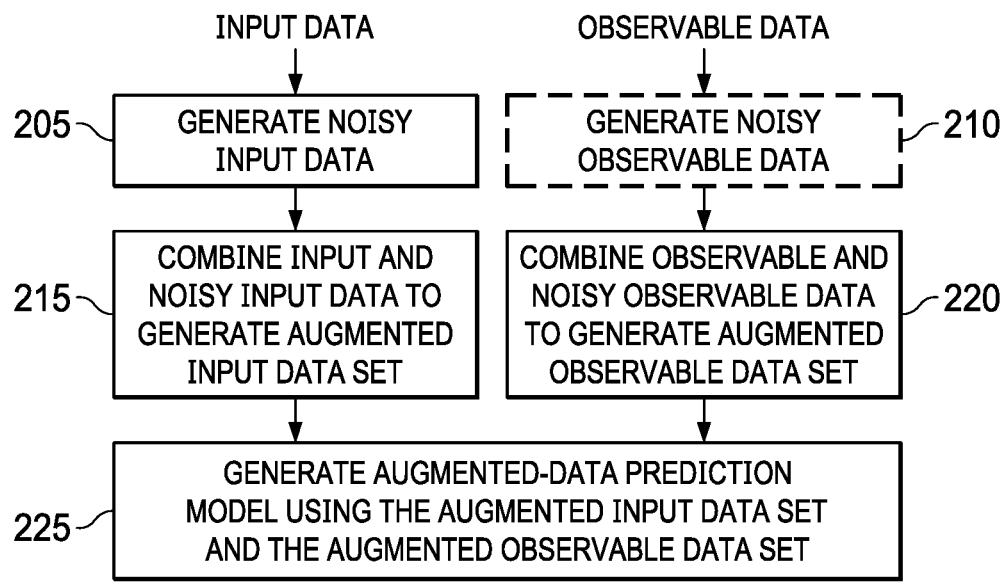
FIG. 2 depicts an example process for designing an augmented-data predictor according to an embodiment of this invention.

FIG. 2 depicts an example process for building an augmented-data predictor under an embodiment. As depicted in FIG. 2, input to this process are pairs of input and observable data e.g., pairs $(x_i, y_i^{(g)})$. In step 205, one generates noisy (or perturbed) input data $\tilde{x}_i$ by adding noise to the original input data (e.g., see equation (9)). From the predictor's point of view, at the output of step 215, there is now an augmented set of input data (e.g., $$S^{(n)} = \begin{bmatrix} S^{(c)} \\ \tilde{S}^{(n)} \end{bmatrix})$$

comprising the original input data and the noisy input data. In step 210, one optionally generates noisy (or perturbed) observable data (e.g., $\tilde{y}_i^{(n)} = y_i^{(g)} + n_i^{(n)}$) based on the input observable data, otherwise $\tilde{y}_i^{(n)} = y_i^{(g)}$. From the predictor's point of view, after step 220, there is now a augmented set of observable and noisy-observable data (e.g., $$\hat{y}^{(n)} = \begin{bmatrix} y^{(g)} \\ \tilde{y}^{(n)} \end{bmatrix} \text{ or } \hat{y}^{(n)} = \begin{bmatrix} y^{(g)} \\ y^{(g)} \end{bmatrix}).$$

Finally, in step 225, one solves for the coefficients of the augmented-data prediction model (e.g., see equation (16)).

Augmented-Data Prediction Using Multi-Channel Models

The earlier discussion used a relatively simple single-channel prediction model. In this section, the methodology is extended to multi-channel regression models, for example, but without limitation, as those described in Ref. [1] and Ref. [2]. As an example, without loss of generality, a detailed methodology will be described for an embodiment using the multi-channel, multiple-regression (MMR) predictor (Ref. [1]); however, a person skilled in the art should be able to extend this methodology to other models, such as the Tensor-Product B-spline (TPB) model (Ref. [2]).

Consider a video sequence, where samples (e.g. SDR pictures) in the t-th frame are denoted as $(s_{t,i}^y, s_{t,i}^{c0}, s_{t,i}^{c1})$, for $i=0, 1, \ldots, P-1$, where each pixel has three color components y, c1, and c2, e.g. (YCbCr, RGB, ICtCb, and the like.) For example, SDR images (125) may represent image data at 100 nits and R709 color gamut, while corresponding HDR images (120) may represent image data at 4,000 nits with a P3 color gamut. Using an MMR model, let output $v_{t,i}^{ch(g)}$, where ch denotes y, c0, or c1, be expressed as a combination of $$\bar{s}_{t,i} = [1 \, s_{t,i}^y \, s_{t,i}^{c0} \, s_{t,i}^{c1} \ldots s_{t,i}^y s_{t,i}^{c0} \ldots (s_{t,i}^y s_{t,i}^{c0})^2 \ldots (s_{t,i}^{c0})^2 (s_{t,i}^{c1})^2 \ldots]. \quad (17a)$$

For example, in an embodiment, using a second order with cross-products MMR representation, a vector $\bar{s}_{t,i}$ may be expressed using 15 values as $$\bar{s}_{j,i} = [1 s_{j,i}^Y s_{j,i}^{C0} s_{j,i}^{C1} (s_{j,i}^Y)^2 (s_{j,i}^{C0})^2 (s_{j,i}^{C1})^2 (s_{j,i}^Y s_{j,p}^{C0})(s_{j,i}^Y s_{t,j,i}^{C1})(s_{j,i}^{C0} s_{j,i}^{C1}) \quad (17b)$$
$$(s_{j,i}^Y)^2 (s_{j,i}^{C0})^2 (s_{j,i}^Y)^2 (s_{j,i}^{C1})^2 (s_{j,i}^{C0})^2 (s_{j,i}^{C1})^2 (s_{j,i}^Y s_{j,i}^{C0} s_{j,i}^{C1})(s_{j,i}^Y s_{j,i}^{C0} s_{j,i}^{C1})^2].$$

In equations (17a-17b), in some embodiments, some terms may be removed to reduce the computational load. For example, one may use in the model only one of the chroma components or one may eliminate completely certain high-order cross components. Without limitation, alternative linear or non-linear predictors may also be employed Let $$S_t^{(g)} = \begin{bmatrix} \bar{s}_{t,0} \\ \bar{s}_{t,0} \\ \vdots \\ \bar{s}_{t,P-1} \end{bmatrix}, \quad (18)$$

then, the observable data (e.g., HDR pictures) can be expressed as $$v_t^{ch,(g)} = \begin{bmatrix} v_{t,0}^{ch,(g)} \\ v_{t,1}^{ch,(g)} \\ \vdots \\ v_{t,P-1}^{ch,(g)} \end{bmatrix}, \quad (19)$$

and the entire ground truth model can be expressed as $$v^{ch,(g)} = S_t^{(g)} m_t^{(g)} + n_t^{(g)}, \quad (20)$$

where $$n_t^{(g)} = \begin{bmatrix} n_{t,0}^{(g)} \\ n_{t,1}^{(g)} \\ \vdots \\ n_{t,P-1}^{(g)} \end{bmatrix} \quad (21)$$

denotes additive noise, e.g., $n_{t,i}^{(g)} \sim N(0, (\sigma_t^{(g)})^2)$.

Note: using white Gaussian noise can be perceived as modeling quantization noise in the open-loop problem using the worst possible noise. A person skilled in the art would appreciate that such noise may be modeled using alternative models known in the art, like Laplacian, Cauchy, and the like.

Given an MMR model in matrix form $$\hat{v}_t^{ch,(c)} = S_t^{(c)} m_t^{(c)}, \quad (22)$$

the parameters of a traditional predictor can be computed using again a minimization problem, like $$m_t^{(c),opt} = \arg\min\|\hat{v}_t^{ch,(c)} - v_t^{ch,(c)}\| = \arg\min\|S_t^{(c)} m_t^{(c)} - v_t^{ch,(c)}\|,$$

with the optimal solution (under MSE) given by $$m_t^{(c),opt} = ((S_t^{(c)})^T (S_t^{(c)}))^{-1} ((S_t^{(c)})^T v_t^{(c)}), \quad (23)$$

where $$S_t^{(c)} = S_t^{(g)} \text{ and } v_t^{ch,(c)} = v_t^{ch,(g)} \quad (24)$$

The augmented-data predictor can be designed according to the methodology described in FIG. 2. As in the single-channel case (see step 205), given input $\{(s_{t,i}^y, s_{t,i}^{c0}, s_{t,i}^{c1})|i=0, 1, \ldots, P-1\}$, a new noise or perturbed set $\{(\tilde{s}_{t,i}^y, \tilde{s}_{t,i}^{c0}, \tilde{s}_{t,i}^{c1})|i=0, 1, \ldots, P-1\}$ is generated by adding noise (e.g., Gaussian noise with distribution $n_{t,i}^{ch,(n)} \sim N(0, (\sigma_t^{ch,(n)})^2)$, e.g., $$\tilde{s}_{t,i}^{ch} = s_{t,i}^{ch} + n_{t,i}^{ch,(n)} \text{ for } i = 0, 1, \ldots, P-1. \tag{25}$$

Let $\tilde{s}_{t,i}^{(n)} = \begin{bmatrix} 1 & \tilde{s}_{t,i}^y & \tilde{s}_{t,i}^{c0} & \tilde{s}_{t,i}^{c1} & \ldots & \tilde{s}_{t,i}^y \tilde{s}_{t,i}^{c0} & \ldots & (\tilde{s}_{t,i}^y \tilde{s}_{t,i}^{c0})^2 & \ldots & (\tilde{s}_{t,i}^{c0})^2 & (\tilde{s}_{t,i}^{c1})^2 & \ldots \end{bmatrix}$, and $$\tilde{S}_t^{(n)} = \begin{bmatrix} \tilde{s}_{t,0}^{(n)} \\ \tilde{s}_{t,0}^{(n)} \\ \vdots \\ \tilde{s}_{t,P-1}^{(n)} \end{bmatrix}. \tag{26}$$

If the observed data $\{\tilde{v}_{t,i}^{ch}|i=0, 1, \ldots, P-1\}$ remains the same as $\{v_{t,i}^{ch,(g)}|i=0, 1, \ldots, P-1\}$ (e.g., step 210 is skipped), then $$\tilde{v}_{t,i}^{ch} = v_{t,i}^{ch,(g)}, \text{ for } i = 0, 1, \ldots, P-1 \tag{27}$$

and $$\tilde{v}_t^{ch,(n)} = \begin{bmatrix} \tilde{v}_{t,0}^{ch} \\ \tilde{v}_{t,1}^{ch} \\ \vdots \\ \tilde{v}_{P-1}^{ch} \end{bmatrix}.$$

In step 215 and 220, combing the old and new data set, yields $$v_t^{ch,(n)} = \begin{bmatrix} v_t^{ch,(c)} \\ \tilde{v}_t^{ch,(n)} \end{bmatrix} \text{ and } S_t^{(n)} = \begin{bmatrix} S_t^{(c)} \\ \tilde{S}_t^{(n)} \end{bmatrix}. \tag{28}$$

Finally, in step 225, the optimization problem $$m_t^{(n),opt} = \arg\min \|v_t^{ch,(n)} - v_t^{ch,(n)}\| = \arg\min \|S_t^{(n)} m_t^{(n)} - v_t^{ch,(n)}\|$$

can be solved using the minimum least squared solution $$m_t^{(n),opt} = ((S_t^{(n)})^T (S_t^{(n)}))^{-1} ((S_t^{(c)})^T v_t^{(n)}) \tag{29}$$

In another embodiment, one can augment the data with additional perturbed input and or output data sets, e.g., by using a different noise variance for each perturbed set. For example, one can create several set of $\tilde{S}_t^{(n),k}$ and $\tilde{v}_t^{ch,(n),k}$ for $k=0, 1, \ldots, K-1$, generating (e.g., in steps 215 and 220), the combined data sets of:

$$v_t^{ch,(n)} = \begin{bmatrix} v_t^{ch,(c)} \\ \tilde{v}_t^{ch,(n),0} \\ \vdots \\ \tilde{v}_t^{ch,(n),K-1} \end{bmatrix} \text{ and } S_t^{(n)} = \begin{bmatrix} S_t^{(c)} \\ \tilde{S}_t^{(n),0} \\ \vdots \\ \tilde{S}_t^{(n),K-1} \end{bmatrix}. \tag{30}$$

The solution of the prediction model is still given by equation (29).

Noise Strength Selection Considerations

A key part of the augmented-data prediction model is in generating perturbed (or noisy) data by adding noise to the original input data. Then, the question comes: how much noise should be added? Intuitively, in video coding, the higher the bit rate then the lower is the quantization noise, thus, at least one parameter influencing the amount of added noise may be the target bit rate of the compressed bitstream.

As used herein, the term "in-range" denotes a pixel range (e.g., [a, b]) of the original test or training data to be used in the prediction model. As used herein, the term, "lower out-of-range" denotes pixel values lower than the smallest in-range value (e.g., a) used in the prediction model. For example, these may be images with very low black values. As used herein, the term, "upper out-of-range" denotes pixel values higher than the maximum in-range value (e.g., b) used in the prediction model. For example, these may be images with very high highlight values.

Experimental results indicate that for any out-of-range data the augmented-data predictor is always better as noise variance increases; however, for in-range data, the augmented-data predictor will only be better if the added noise has a standard deviation lower than a certain "optimal" value, to be indicated as $\sigma_t^{ch,(n),opt}$. Thus, one can express this optimal noise variance as $$\sigma_t^{ch,(n),opt} = \arg\min_{\{\sigma_t^{ch,(n)} > \Delta\}} |\overline{D}_{t,n}^{(n)}(\sigma_t^{ch,(n)}) - \overline{D}_{t,n}^{(c)}|, \tag{31}$$

where $\overline{D}_{t,n}^{(n)}(\sigma_t^{ch,(n)})$ denotes a measure of average distortion using augmented input data with white Gaussian noise with standard deviation $\sigma_t^{ch,(n)}$, and $\overline{D}_{t,n}^{(n)}$ denotes average distortion in prediction with a traditional prediction model, e.g., $$D_t^{(c),r} = \frac{1}{P} \sum_{i=0}^{P-1} \|\hat{v}_{t,r,i}^{ch,(c)} - v_{t,r,i}^{ch,(g)}\|.$$

These observations indicate that another parameter influencing noise strength is the dynamic range of the output (e.g., HDR) data, and in particular the dynamic range of the chroma color components in the HDR input. Experimental data also show that the larger the value of P, the more robust is the augmented-data model; however, in practice, due to the large number of computations, one rarely operates directly on all pixel values. Instead one may operate with sub-sampled images or "average" pixel values. For example, one may divide the input signal codewords into M non-overlapping bins (e.g., M=16, 32, or 64) with equal interval $w_b$ (e.g., for 16-bit input data, $w_b$=65,536/M) to cover the whole normalized dynamic range (e.g., (0,1]). Then, instead of operating with pixel values one may operate with the average pixel values within each such bin. Denote as $P_t$ the number of HDR bins (also to be referred as three-dimensional mapping tables (3DMT)), then in an embodiment, the noise strength may be derived based on the following heuristic $$\sigma_t^{ch,(n)} = \mu \cdot \exp\left(-\frac{P_t}{\Delta_P}\right) \exp\left(-\frac{R_t^{ch,(g)}}{\Delta_R}\right), \tag{32}$$

where, given $v_{t,max}^{ch,(g)} = \max\{v_{t,i}^{ch,(g)}\}$, $v_{t,min}^{ch,(g)} = \min\{v_{t,i}^{ch,(g)}\}$, then $$R_t^{ch,(g)} = v_{t,max}^{ch,(g)} - v_{t,min}^{ch,(g)} \quad (33)$$

denotes the active dynamic range of the observation data, $\mu$ denotes a maximal noise strength (e.g., $\mu=0.08$), $\Delta_P$ is a parameter to control the spread in terms of input data count (e.g., $\Delta_P=3,000$), and $\Delta_R$ is a parameter to control the spread in terms of observation data range (e.g., $\Delta_P=7,000$ when bit depth=16 bits). This model provides slower decay when input increases.

In another embodiment, an alternative approach would be to provide faster decay with higher order terms inside the exponential function:

$$\sigma_c^{ch,(n)} = \mu \cdot \exp\left(-\left(\frac{P_t}{\Delta_P}\right)^\alpha\right) \exp\left(-\left(\frac{R_t^{ch,(g)}}{\Delta_R}\right)^\alpha\right), \quad (34)$$

where $\alpha > 1$.

In an embodiment, in both equations (32) and (34) one may add a bit-rate-related multiplier factor, for example:

$$\sigma_t^{ch,(n)} = \mu \cdot \exp\left(-\left(\frac{P_t}{\Delta_P}\right)^\alpha\right) \exp\left(-\left(\frac{R_t^{ch,(g)}}{\Delta_R}\right)^\alpha\right) \exp\left(-\left(\frac{\text{bit rate}}{\Delta_B}\right)^\alpha\right), \quad (35)$$

where $\Delta_B$ is a parameter to control the spread in terms of the average bit rate being used to generate the noise (e.g., $\Delta_B=2$ Mbits/s). For example, at high bit rates (e.g., at 5.2 Mbits/s or higher) the noise strength could be almost zero. In an embodiment, in equation (35), the value of $\alpha$ in each exponential factor may have a distinct value (e.g., each $\alpha$ may be replaced by distinct value, such as $\alpha_P$, $\alpha_R$, and $\alpha_B$.)

In an embodiment, one may generate the optimized noise strength for each target bit rate, thus generating a dedicated set of prediction parameters for each bit rate. In another embodiment, a service provider may desire to use one set (or just a couple of sets). For example, with one set of optimized MMR parameters, one may use the worst possible scenario (e.g., the smallest resolution at the lowest bit rate) to add the noise. In such a scenario, the bit-rate related exponential term in equation (35) may be considered a fixed value which can be absorbed into it (e.g., see equation (34)).

Figure 3:
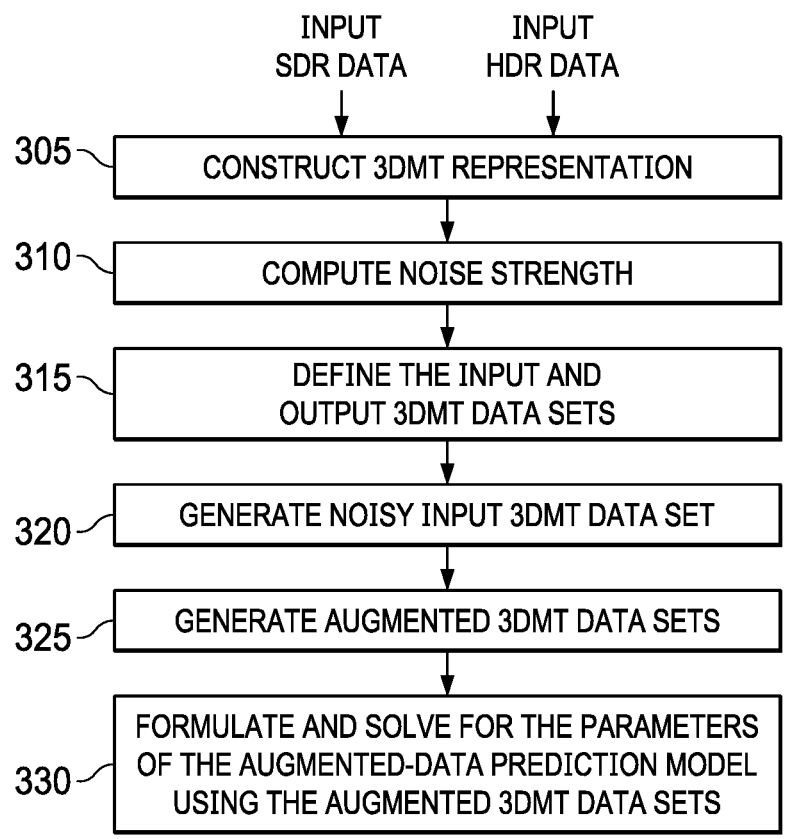
FIG. 3 depicts an example process for designing an augmented-data predictor using a 3DMT data representation according to an embodiment of this invention.

Given the heuristic noise model (see equation (35)), FIG. 3 depicts an example process for augmented-data prediction for an open-loop 3DMT architecture (e.g., as depicted in FIG. 1D). Denote as $v_{t,i}=[v_{t,i}^y, v_{t,i}^{c0}, v_{t,i}^{c1}]^T$ the color component values of the i-th pixel for the t-th frame of the reference HDR input. Denote the corresponding SDR pixel values as $s_{t,i}=[s_{t,i}^y, s_{t,i}^{c0}, s_{t,i}^{c1}]^T$. Denote the min and max values in each color channel as $(s_t^{ch,min}, s_t^{ch,max})$ in the SDR image and as $(v_t^{ch,min}, v_t^{ch,max})$ in the HDR image.

As depicted in FIG. 3, the process starts in step 305 with constructing a 3DMT representation (see also Refs. [3-4]), which can be summarized as follows:

a) quantize the dynamic range of the SDR image, in each channel, using a fixed number of bins $Q_y$, $Q_{C_0}$, $Q_{C_1}$ for each component. This partition may use uniform partition boundaries which cover the min/max $(s_t^{ch,min}, s_t^{ch,max})$ range in each dimension to compute the $(Q_y \times Q_{C_0} \times Q_{C_1})$ 3D histogram. The quantization interval in each channel is given by:

$$d_t^{ch} = (s_t^{ch,max} - s_t^{ch,min})/Q_{ch}.$$

Denote the 3D histogram bin as $\Omega_t^{Q,s}$, where $Q=[Q_y, Q_{C_0}, Q_{C_1}]$. Thus, $\Omega_t^{Q,s}$ contains a total $(Q_y \cdot Q_{C_0} \cdot Q_{C_1})$ bins, such that each 3D bin is specified by the bin index $q=(q_y, q_{C_0}, q_{C_1})$, which represents the number of pixels having those 3-channel quantized values. To simplify the notation, one may vectorize the 3D bin index $\{q\}$ to a 1-D index $\{q\}$.

$$q = q_y \cdot Q_{C_0} \cdot Q_{C_1} + q_{C_0} \cdot Q_{C_1} + q_{C_1}.$$

b) Compute the sum of each color component in the HDR for each 3D bin. Let $\Psi_{t,y}^{Q,v}$, $\Psi_{t,C_0}^{Q,v}$ and $\Psi_{t,C_1}^{Q,v}$ be the mapped luma and chroma values in the HDR image domain such that each bin of these contains the sum of all HDR luma and two chroma (Co and C1, respectively) pixel values where the corresponding pixel value lies in that bin. Assuming P pixels, the operations can be summarized using pseudocode as follows:

```
// STEP 1: initialization
Ω_{t,q}^{Q,s} = 0 where q_{ch} = 0, ..., Q_{ch} − 1, for each ch = {y, C_0, C_1}
Ψ_{t,y,q}^{Q,v} = 0 where q_{ch} = 0, ..., Q_{ch} − 1, for each ch = {y, C_0, C_1}
Ψ_{t,C_0,q}^{Q,s} = 0 where q_{ch} = 0, ..., Q_{ch} − 1, for each ch = {y, C_0, C_1}
// STEP 2: scan for each pixel in input image; compute histogram and
sum for ( i = 0; i < P ; i ++){ q_y = ⌊(s_{t,i}^y − s_{t,i}^{y,min})/d_t^y⌋;         // SDR image's luma quantized value q_{C_0} = ⌊(s_{t,i}^{C_0} − s_{t,i}^{C_0,min})/d_t^{C_0}⌋;   // SDR image's chroma 0 quantized value q_{C_1} = ⌊(s_{t,i}^{C_1} − s_{t,i}^{C_1,min})/d_t^{C_1}⌋;   // SDR image's chroma 1 quantized value q = q_y · Q_{C_0} · Q_{C_1} + q_{C_0} · Q_{C_1} + q_{C_1};   // get 1D index
  Ω_{t,q}^{Q,s} ++;                              // 3D histogram in SDR image
  Ψ_{t,y,q}^{Q,v} = Ψ_{t,y,q}^{Q,v} + v_{t,i}^y ;       // HDR image's y values
  Ψ_{t,C_0,q}^{Q,v} = Ψ_{t,C_0,q}^{Q,v} + v_{t,i}^{c0} ; // HDR image's C_0 values
  Ψ_{t,C_1,q}^{Q,v} = Ψ_{t,C_1,q}^{Q,v} + v_{t,i}^{c1} ; // SDR image's C_1 values
  Ψ_{t,y,q}^{Q,s} = Ψ_{t,y,q}^{Q,s} + s_{t,i}^y ;       // SDR image's y values
  Ψ_{t,C_0,q}^{Q,s} = Ψ_{t,C_0,q}^{Q,s} + s_{t,i}^{c0} ; // SDR image's C_0 values
  Ψ_{t,C_1,q}^{Q,s} = Ψ_{t,C_1,q}^{Q,s} + s_{t,i}^{c1} ; // SDR image's C_1 values
}
``` c) Find the 3D histogram bins that have non-zero number of pixels. In other words, collect all non-zero entries to set $\Phi_t^Q$. Compute the averages for HDR ($\Psi_{t,y,q}^{Q,v}$, $\Psi_{t,C_1,q}^{Q,v}$, $\Psi_{t,C_0,q}^{Q,v}$) and SDR ($\Psi_{t,y,q}^{Q,s}$, $\Psi_{t,C_1,q}^{Q,s}$, $\Psi_{t,C_0}^{Q,s}$).

```
// initialize
i = 0;
for (q=0; q < Q_y ×Q_{C_0} ×Q_{C_1} ; q++) {
  if(Ω_{t,q}^{Q,v}> 0 ){
    Φ_t^Q = Φ_t^Q ∪ q ;
```

$$\Psi_{t,y,i}^{Q,v} = \frac{\Psi_{t,y,q}^{Q,v}}{\Omega_{t,q}^{Q,v}};$$   // Average 3D-Mapping HDR image y values $$\Psi_{t,C_0,i}^{Q,v} = \frac{\Psi_{t,C_0,q}^{Q,v}}{\Omega_{t,q}^{Q,v}};$$   // Average 3D-Mapping HDR image $C_0$ values $$\Psi_{t,C_1,i}^{Q,v} = \frac{\Psi_{t,C_1,q}^{Q,v}}{\Omega_{t,q}^{Q,v}};$$   // Average 3D-Mapping HDR image $C_1$ values $$\Psi_{t,y,i}^{Q,s} = \frac{\Psi_{t,y,q}^{Q,s}}{\Omega_{t,q}^{Q,v}};$$   // Average 3D-Mapping SDR image y values $$\Psi_{t,C_0,i}^{Q,s} = \frac{\Psi_{t,C_0,q}^{Q,s}}{\Omega_{t,q}^{Q,v}};$$   // Average 3D-Mapping SDR image $C_0$ values

```
         Ψ_{t,C_1,q}^{Q,s}
Ψ_{t,C_1,i}^{Q,s} = ─────────   // Average 3D-Mapping SDR image C_1 values
          Ω_{t,q}^{Q,v}
      i++;
   }
}
```

Denote the number of elements in $\Phi_t^Q$ as $P_t$. Let, $$\Psi_{t,i}^{Q,v} = [\Psi_{t,y,i}^{Q,v}, \Psi_{t,C_0,i}^{Q,v}, \Psi_{t,C_1,i}^{Q,v}]^T, \quad (36a)$$

and $$\Psi_{t,i}^{Q,s} = [\Psi_{t,y,i}^{Q,s}, \Psi_{t,C_0,i}^{Q,s}, \Psi_{t,C_1,i}^{Q,s}]^T, \quad (36b)$$

Then, one has the mapping pair $\{\Psi_{t,i}^{Q,v}\}$ and $\{\Psi_{t,i}^{Q,s}\}$ for elements in $\Phi_t^Q$.

In step 310, the noise strength may be computed as follows: given $P_t$, the number of 3DMT bins, in an embodiment, a chroma range $R_t$ can be computed as the average of the dynamic range in the two color channels:

$$R_t = \tfrac{1}{2}((v_t^{c0,max} - v_t^{c0,min}) \pm (v_t^{c1,max} - v_t^{c1,min})) \quad (37)$$

Then, the noise strength can be computed as in equations (34) or (35).

In another embodiment, the noise standard deviation can be computed separately for luma and each color component, at the expense of a higher complexity. Alternatively, instead of computing $R_t$ by averaging the chroma ranges one may use the maximum or minimum of the two chroma ranges. In general though, experimental results targeting improved chroma quality showed that computing $R_t$ as described yields satisfactory results at a reasonable complexity cost.

In step 315, assuming, with no loss of generality, an MMR prediction model, given equation (36b), the SDR input data set may be formulated as $$\bar{s}_{t,i} = [1\ \Psi_{t,y,i}^{Q,s}\Psi_{t,C_0,i}^{Q,s}\Psi_{t,C_1,i}^{Q,s}\ \ldots\ \Psi_{t,y,i}^{Q,s}\Psi_{t,C_0,i}^{Q,s} \ldots (\Psi_{t,y,i}^{Q,s}\Psi_{t,C_0,i}^{Q,s})^2 \ldots (\Psi_{t,y,i}^{Q,s})^2(\Psi_{t,C_0,i}^{Q,s})^2 \ldots]^T.$$

Collecting all $P_t$ entries yields $$S_t^{(c)} = \begin{bmatrix} (\bar{s}_{t,0})^T \\ (\bar{s}_{t,1})^T \\ \vdots \\ (\bar{s}_{t,P_t-1})^T \end{bmatrix}.$$

Similarly, the 3DMT HDR chroma values in vector forms may be expressed as:

$$v_t^{c0,(c)} = \begin{bmatrix} \Psi_{t,C_0,0}^{Q,v} \\ \Psi_{t,C_0,1}^{Q,v} \\ \vdots \\ \Psi_{t,C_0,P_t-1}^{Q,v} \end{bmatrix} \text{ and } v_t^{c1,(c)} = \begin{bmatrix} \Psi_{t,C_1,0}^{Q,v} \\ \Psi_{t,C_1,1}^{Q,v} \\ \vdots \\ \Psi_{t,C_1,P_t-1}^{Q,v} \end{bmatrix}.$$

In step 320, adding noise to each 3DMT entry $$\Psi_{t,i}^{Q,s} = [\Psi_{t,y,i}^{Q,s}, \Psi_{t,C_0,i}^{Q,s}, \Psi_{t,C_1,i}^{Q,s}]^T,$$

yields noisy input 3DMT data, given by $$\Psi_{t,i}^{Q,s,(n)} = [\Psi_{t,y,i}^{Q,s} + n_{t,i}^{y,(n)}, \Psi_{t,C_0,i}^{Q,s} + n_{t,i}^{c0,(n)}, \Psi_{t,C_1,i}^{Q,s} + n_{t,i}^{c1,(n)}]^T,$$

where the noise in each channel has the same distribution, e.g., $$n_{t,i}^{ch,(n)} \sim N(0, (\sigma_t^{(n)})^2).$$

In step 325, the augmented input 3DMT data set is generated as follows: Denote the MMR expanded form for the noisy input as $$\bar{s}_{t,i}^{(n)} = [1\ \Psi_{t,y,i}^{Q,s,(n)}\Psi_{t,C_0,i}^{Q,s,(n)}\Psi_{t,C_1,i}^{Q,s,(n)}\ \ldots\ \Psi_{t,y,i}^{Q,s,(n)}\Psi_{t,C_0,i}^{Q,s,(n)} \ldots (\Psi_{t,y,i}^{Q,s,(n)})^2(\Psi_{t,C_0,i}^{Q,s,(n)})^2 \ldots (\Psi_{t,y,i}^{Q,s,(n)})^2(\Psi_{t,C_0,i}^{Q,s,(n)})^2 \ldots]^T$$

Then, for $$\bar{S}_t^{(n)} = \begin{bmatrix} (\bar{s}_{t,0}^{(n)})^T \\ (\bar{s}_{t,1}^{(n)})^T \\ \vdots \\ (\bar{s}_{t,P_t-1}^{(n)})^T \end{bmatrix},$$

$$\bar{v}_t^{c0,(n)} = \begin{bmatrix} \Psi_{t,C_0,0}^{Q,v} \\ \Psi_{t,C_0,1}^{Q,v} \\ \vdots \\ \Psi_{t,C_0,P_t-1}^{Q,v} \end{bmatrix}, \text{ and } \bar{v}_t^{c1,(n)} = \begin{bmatrix} \Psi_{t,C_1,0}^{Q,v} \\ \Psi_{t,C_1,1}^{Q,v} \\ \vdots \\ \Psi_{t,C_1,P_t-1}^{Q,v} \end{bmatrix},$$

the augmented data sets are given by $$v_t^{ch,(n)} = \begin{bmatrix} v_t^{ch,(c)} \\ \bar{v}_t^{ch,(n)} \end{bmatrix} \text{ and } S_t^{(n)} = \begin{bmatrix} S_t^{(c)} \\ \bar{S}_t^{(n)} \end{bmatrix}.$$

In an embodiment, in step 330, the new prediction model may be described as:

$$B_t = (S_t^{(n)})^T S_t^{(n)} \quad (38)$$

$$a_t^{ch} = (S_t^{(n)})^T v_t^{ch,(n)}$$

with an optimal solution (under the MSE criterion) given by (Ref. [3-4])

$$m_t^{ch,(n),opt} = (B_t)^{-1}(a_t^{ch}). \quad (39)$$

REFERENCES

Each of these references is incorporated herein by reference in its entirety.

1. G-M. Su et al., "Multiple color channel multiple regression predictor," U.S. Pat. No. 8,811,490.
2. G-M Su et al., "Tensor-product B-Spline predictor," U.S. Provisional patent application, Ser. No. 62/908,770, filed on Oct. 1, 2019.
3. N. J. Gadgil and G-M. Su, "Linear encoder for image/video processing," PCT Application Ser. No. PCT/US2019/020115, filed on Feb. 28, 2019, published as WO2019/169174.
4. Q. Song et al., "High-fidelity full reference and high-efficiency reduced reference encoding in end-to-end single-layer backward compatible encoding pipeline," WIPO PCT Publication, WO2019/217751, Nov. 14, 2019.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to image prediction techniques, such as those described herein. The computer and/or IC may compute, any of a variety of parameters or values that relate to the generation of image prediction techniques as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for image prediction techniques as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to image prediction techniques are thus described. In the foregoing specification, embodiments of the present invention have been described with reference to numerous specific details that may vary from implementation to implementation. Thus, the sole and exclusive indicator of what is the invention and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

1. A method for generating prediction coefficients with a processor, the method comprising:
   accessing a first input image (120) in a first dynamic range and a second input image (125) in a second dynamic range, wherein the first input image and the second input image represent an identical scene;
   generating noise data with a noise strength based at least on characteristics of the first input image;
   generating a noise input data set by adding the noise data to the second input image;
   generating a first augmented input data set based on the first input image;
   combining the second input image and the noise input data set to generate a second augmented input data set;
   generating a prediction model to predict the first augmented input data set based on the second augmented input data set;
   solving the prediction model according to a minimization-error criterion to generate a set of prediction-model parameters;
   compressing the second input image to generate a compressed bitstream; and
   generating an output bitstream comprising the compressed bitstream and the prediction-model parameters.

2. The method of EEE 1, further comprising, in a decoder:
   receiving the output bitstream comprising the compressed bitstream and the prediction-model parameters;
   decoding the output bitstream to generate a first output image in the second dynamic range; and
   applying the prediction-model parameters to the first output image to generate a second output image in the first dynamic range.

3. The method of EEE 1 or EEE 2, wherein the first dynamic range comprises a high dynamic range and the second dynamic range comprises a standard dynamic range.

4. The method of any of EEEs 1-3, wherein generating the noise data comprises:
   computing statistics based on pixel values of the first input image;
   computing a noise standard deviation based on the statistics; and
   generating noise samples of the noise data using a Gaussian distribution with zero mean and the noise standard deviation.

5. The method of EEE 4, wherein computing the noise standard deviation is further based on a target bit-rate for generating the compressed bitstream and/or characteristics of the second input image.

6. The method of EEE 4 or EEE 5, wherein computing the statistics comprises computing one or more of: a total number of pixel values in the first input image, a range of pixel values in a luma component of the first input image, a range of pixel values in a chroma component of the first input image, or a number of bins characterizing groups of average pixel values representing the first input image.

7. The method of any of EEEs 1-6, wherein the prediction model comprises a single channel predictor, a multi-channel, multiple regression (MMR) predictor.

8. The method of any of EEEs 1-7, wherein solving the prediction model comprises minimizing an error metric between an output of the prediction model and the first input image.

9. The method of EEE 8, wherein generating the set of prediction-model parameters comprises computing $$m_t^{(n),opt} = ((S_t^{(n)})^T (S_t^{(n)}))^{-1} ((S_t^{(n)})^T v_t^{(n)}),$$

wherein $m_t^{(n),opt}$ denotes a vector representation of the prediction-model parameters, $v_t^{(n)}$ denotes the first augmented input data set, and $S_t^{(n)}$ denotes a matrix based on the second augmented input data set.

10. The method of EEE 9, wherein, for a color component ch, $$v_t^{ch,(n)} = \begin{bmatrix} v_t^{ch,(c)} \\ \tilde{v}_t^{ch,(n)} \end{bmatrix} \text{ and } S_t^{(n)} = \begin{bmatrix} S_t^{(c)} \\ \tilde{S}_t^{(n)} \end{bmatrix},$$

wherein $v_t^{ch,(n)}$ denotes pixels values of the first augmented input data set $v_t^{ch,(c)}$ comprises pixel values of the first input image, and $\tilde{v}_t^{ch,(n)}$ comprises either pixel values of the first input image, wherein $\tilde{v}_t^{ch,(n)} = v_t^{ch,(n)}$, or pixel values of the first input image with added noise.

11. The method of any of EEEs 1-10, further comprising:
    generating a first modified data set based on a modified representation of the first input image;
    generating a second modified data set based on the modified representation of the second input image;
    generating the noise input data set by adding the noise data to the second modified data set;
    generating the first augmented input data set based on the first modified data set; and
    combining the second modified data set and the noise input data set to generate the second augmented input data set.

12. The method of EEE 11, wherein the first modified data set comprises a sub-sampled version of the first input image or a three-dimensional table mapping (3DMT) representation of the first input image.

13. The method of EEE 11 or EEE 12, wherein the second modified data set comprises a sub-sampled version of the second input image or a three-dimensional table mapping (3DMT) representation of the second input image.

14. A non-transitory computer-readable storage medium having stored thereon computer-executable instructions for executing with one or more processors a method in accordance with any one of the EEEs 1-13.

15. An apparatus comprising a processor and configured to perform any of the methods recited in EEEs 1-13.

The invention claimed is:

1. A method for generating prediction coefficients with a processor, the method comprising:
    accessing a first input image in a first dynamic range and a second input image in a second dynamic range, wherein the first input image and the second input image represent an identical scene;
    generating noise data with a noise strength parameter, wherein the noise strength parameter is determined based at least on characteristics of the first input image, wherein a statistical distribution function is invoked with the noise strength parameter as its function argument to generate the noise data;
    generating a noise input data set by adding the noise data to the second input image;
    combining the first input image and the noise input data set to generate a first augmented input data set;
    combining the second input image and the noise input data set to generate a second augmented input data set;
    generating a prediction model to predict the first augmented input data set based on the second augmented input data set;
    solving the prediction model according to a minimization-error criterion to generate a set of prediction-model parameters;
    compressing the second input image to generate a compressed bitstream; and generating an output bitstream comprising the compressed bitstream and the prediction-model parameters.

2. The method of claim 1, wherein the characteristics of the first input image is a dynamic range of one or more chroma color components in the first input image.

3. The method of claim 1, further comprising, in a decoder:
    receiving the output bitstream comprising the compressed bitstream and the prediction-model parameters;
    decoding the output bitstream to generate a first output image in the second dynamic range; and
        applying the prediction-model parameters to the first output image to generate a second output image in the first dynamic range.

4. The method of claim 1, wherein the first dynamic range comprises a high dynamic range and the second dynamic range comprises a standard dynamic range.

5. The method of claim 1, wherein generating the noise data comprises:
    computing statistics based on pixel values of the first input image;
    computing a noise standard deviation based on the statistics; and
    generating noise samples of the noise data using a Gaussian distribution with zero mean and the noise standard deviation.

6. The method of claim 5, wherein computing the noise standard deviation is further based on a target bit-rate for generating the compressed bitstream and/or characteristics of the second input image.

7. The method of claim 5, wherein computing the statistics comprises computing one or more of: a total number of pixel values in the first input image, a range of pixel values in a luma component of the first input image, a range of pixel values in a chroma component of the first input image, or a number of bins characterizing groups of average pixel values representing the first input image.

8. The method of claim 1, wherein the prediction model comprises a single channel predictor, or a multi-channel multiple regression (MMR) predictor.

9. The method of claim 1, wherein solving the prediction model comprises minimizing an error metric between an output of the prediction model and the first input image.

10. The method of claim 9, wherein generating the set of prediction-model parameters comprises computing $$m_t^{(n),opt} = ((S_t^{(n)})^T (S_t^{(n)}))^{-1} ((S_t^{(n)})^T v_t^{(n)}),$$

wherein $(m)_t^{(n),opt}$ denotes a vector representation of the prediction-model parameters, $v_t^{(n)}$ denotes the first augmented input data set, and $S_t^{(n)}$ denotes a matrix based on the second augmented input data set.

11. The method of claim 10, wherein, for a color component ch, $$v_t^{ch,(n)} = \begin{bmatrix} v_t^{ch,(c)} \\ \tilde{v}_t^{ch,(n)} \end{bmatrix} \text{ and } S_t^{(n)} = \begin{bmatrix} S_t^{(c)} \\ \tilde{S}_t^{(n)} \end{bmatrix},$$

wherein $v_t^{ch,(n)}$ denotes pixels values of the first augmented input data set, $v_t^{ch,(c)}$ comprises pixel values of the first input image, and $\tilde{v}_t^{ch,(n)}$ comprises either pixel values of the first input image, wherein $\tilde{v}_t^{ch,(n)} = v_t^{ch,(n)}$, or pixel values of the first input image with added noise.

12. The method of claim 1, further comprising:
generating a first modified data set based on a modified representation of the first input image;
generating a second modified data set based on the modified representation of the second input image;
generating the noise input data set by adding the noise data to the second modified data set;
generating the first augmented input data set based on the first modified data set; and
combining the second modified data set and the noise input data set to generate the second augmented input data set.

13. The method of claim 12, wherein the first modified data set comprises a sub-sampled version of the first input image or a three-dimensional table mapping (3DMT) representation of the first input image.

14. The method of claim 12, wherein the second modified data set comprises a sub-sampled version of the second input image or a three-dimensional table mapping (3DMT) representation of the second input image.

15. A non-transitory computer-readable storage medium having stored thereon computer-executable instructions for executing with one or more processors a method in accordance with claim 1.

16. An apparatus comprising a processor and configured to perform the method recited in claim 1.

* * * * *